(12) United States Patent
Mildh

(10) Patent No.: US 11,304,055 B2
(45) Date of Patent: Apr. 12, 2022

(54) DETECTING NETWORK JAMMING

(71) Applicant: TELEFONAKTIEBOLAGET LM ERICSSON (PUBL), Stockholm (SE)

(72) Inventor: Gunnar Mildh, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 588 days.

(21) Appl. No.: 16/325,079

(22) PCT Filed: Aug. 11, 2017

(86) PCT No.: PCT/IB2017/054914
§ 371 (c)(1),
(2) Date: Feb. 12, 2019

(87) PCT Pub. No.: WO2018/029648
PCT Pub. Date: Feb. 15, 2018

(65) Prior Publication Data
US 2021/0306856 A1     Sep. 30, 2021

Related U.S. Application Data

(60) Provisional application No. 62/374,457, filed on Aug. 12, 2016.

(51) Int. Cl.
*H04W 12/065* (2021.01)
*H04W 76/19* (2018.01)
*H04K 3/00* (2006.01)

(52) U.S. Cl.
CPC .......... *H04W 12/065* (2021.01); *H04K 3/222* (2013.01); *H04K 3/224* (2013.01); *H04K 3/25* (2013.01); *H04W 76/19* (2018.02)

(58) Field of Classification Search
CPC ...... H04L 67/12; H04L 67/22; H04W 12/122; H04W 24/04; H04W 24/00; H04W 24/08; H04K 3/28
See application file for complete search history.

(56) References Cited

U.S. PATENT DOCUMENTS

| 2007/0224963 A1 | 9/2007 | Moscovitz et al. | |
| 2011/0092151 A1* | 4/2011 | Brisebois | H04W 52/244 455/1 |
| 2011/0148713 A1* | 6/2011 | D'Avello | G01S 19/215 342/457 |
| 2011/0151795 A1* | 6/2011 | D'Avello | H04W 48/04 455/63.3 |

(Continued)

FOREIGN PATENT DOCUMENTS

| EP | 2595324 A1 | 5/2013 |
| WO | 2010077790 A1 | 7/2010 |

OTHER PUBLICATIONS

Fragkiadakis, "Anomaly-based intrusion detection of jamming attacks, local versus collaborative detection", Published online Jan. 28, 2013 (Year: 2013).*

*Primary Examiner* — Dung Hong
(74) *Attorney, Agent, or Firm* — Sage Patent Group

(57) ABSTRACT

A method in a wireless device comprises monitoring one or more aspects of signaling with a network for abnormal signals indicative of network jamming. The method comprises detecting, based on the monitored one or more aspects of signaling with the network, one or more abnormal signals indicative of network jamming.

22 Claims, 9 Drawing Sheets

(56) References Cited

U.S. PATENT DOCUMENTS

| | | | | |
|---|---|---|---|---|
| 2013/0344823 A1* | 12/2013 | Almgren | ............... | H04K 3/226 |
| | | | | 455/90.1 |
| 2014/0057626 A1* | 2/2014 | Uelk | ............... | H04L 43/16 |
| | | | | 455/423 |
| 2014/0204766 A1* | 7/2014 | Immendorf | ........... | H04W 24/04 |
| | | | | 370/242 |
| 2014/0206279 A1* | 7/2014 | Immendorf | ............. | H04K 3/41 |
| | | | | 455/1 |
| 2014/0206343 A1* | 7/2014 | Immendorf | ............. | H04K 3/22 |
| | | | | 455/423 |
| 2016/0043827 A1* | 2/2016 | Filson | ................... | H04K 3/226 |
| | | | | 370/252 |

* cited by examiner

DETECTING NETWORK JAMMING

This application is a 371 of International Application No. PCT/IB2017/054914, filed Aug. 11, 2017, which claims priority to U.S. application Ser. No. 62/374,457, filed Aug. 12, 2016, the disclosures of which are fully incorporated herein by reference.

TECHNICAL FIELD

The present disclosure relates, in general, to wireless communications and, more particularly, to detecting network jamming.

BACKGROUND

The 3$^{rd}$ Generation Partnership Project (3GPP) is currently in the process of specifying a future radio access network (RAN) currently called New Radio (NR) or NR RAN. As described in 3GPP Technical Report (TR) 38.913, one of the requirements is that the RAN design for the Next Generation Radio Access Technologies shall ensure resilience against jamming. The concept of network jamming includes intentional unlawful radio transmissions with the purpose of disturbing network traffic and coverage.

There are a number of known techniques for providing resilience towards network jamming. These include employing frequency hopping or other redundancy or diversity mechanisms to improve the success of communication even with active jamming. A problem with using these mechanisms for combatting jamming in cellular networks is that they negatively influence the efficiency of the system, which is a key performance indicator for cellular systems. For example, employing frequency hopping requires more spectrum to be used, which tends to result in lower spectrum efficiency. Given that radio spectrum is a scarce resource, high spectrum efficiency is important. Other diversity mechanisms (such as using more antennas and/or more robust coding) have similar negative impacts because the diversity mechanism(s) could instead be used to improve bit-rates or the capacity of the system (e.g., using advanced Multiple Input Multiple Output (MIMO) schemes).

For these reasons, it may be infeasible or impractical for cellular networks to employ mechanisms for combatting jamming. Accordingly, it would be desirable to introduce efficient mechanisms for detecting jamming.

SUMMARY

To address the foregoing problems with existing approaches, disclosed is a method in a wireless device. The method comprises monitoring one or more aspects of signaling with a network for abnormal signals indicative of network jamming. The method comprises detecting, based on the monitored one or more aspects of signaling with the network, one or more abnormal signals indicative of network jamming.

In certain embodiments, monitoring one or more aspects of signaling with the network for abnormal signals indicative of network jamming may comprise measuring one or more transmissions in a frequency band used by an operator of the network that are not associated with one or more of: a known pilot signal; and a known reference signal.

In certain embodiments, monitoring one or more aspects of signaling with the network for abnormal signals indicative of network jamming may comprise measuring one or more transmissions in a frequency band used by an operator of the network that are associated with one or more of: a known pilot signal; and a known reference signal. Detecting, based on the monitored one or more aspects of signaling with the network, the one or more abnormal signals indicative of network jamming may comprise determining that the one or more transmissions do not provide system information enabling the wireless device to access the network. Detecting, based on the monitored one or more aspects of signaling with the network, the one or more abnormal signals indicative of network jamming may comprise determining that the one or more transmissions provide system information enabling the wireless device to access the network and one or more of the following conditions are met: the system information does not provide a correct security parameters; the system information includes one or more errors that are not consistent with a configuration of the wireless device; and a threshold number of access attempts by the wireless device using the provided system information have failed.

In certain embodiments, detecting, based on the monitored one or more aspects of signaling with the network, the one or more abnormal signals indicative of network jamming may comprise determining that the network fails to authenticate itself to the wireless device after the wireless device accesses the network. In certain embodiments, detecting, based on the monitored one or more aspects of signaling with the network, the one or more abnormal signals indicative of network jamming may comprise determining that a number of received signals that do not contain a correct security checksum exceeds a threshold value.

In certain embodiments, the method may comprise reporting, to a network node of the network, that the wireless device has detected one or more abnormal signals indicative of network jamming. The report may comprise one or more of: a type of measurement performed by the wireless device; a type of signal detected by the wireless device; a time a signal was detected by the wireless device; a date the signal was detected by the wireless device; an indication of a location of the wireless device; an indication of a frequency of the signal measured or detected by the wireless device; and a radio access type. The reporting may occur at one or more of: upon detecting the one or more abnormal signals indicative of network jamming; and at a time when the wireless device regains connectivity to the network.

In certain embodiments, the method may comprise sending one or more measurement reports to a network node for use by the network node or another network node to detect network jamming.

Also disclosed is a wireless device. The wireless device comprises processing circuitry. The processing circuitry is configured to monitor one or more aspects of signaling with a network for abnormal signals indicative of network jamming. The processing circuitry is configured to detect, based on the monitored one or more aspects of signaling with the network, one or more abnormal signals indicative of network jamming.

Also disclosed is a method in a network node. The method comprises monitoring one or more aspects of network activity for an indication of network jamming. The method comprises detecting, based on the monitored one or more aspects of network activity, that network jamming is occurring in the network.

In certain embodiments, monitoring one or more aspects of network activity for an indication of network jamming may comprise determining that a number of wireless devices are requesting one or more channels that are subsequently not used, and detecting that network jamming is occurring in the network may comprise determining that the number of wireless devices requesting the one or more channels that are subsequently not used exceeds a threshold value.

In certain embodiments, monitoring one or more aspects of network activity for an indication of network jamming may comprise monitoring an interference level in the network, and detecting that network jamming is occurring in the network may comprise determining that the interference level in the network is above a threshold value.

In certain embodiments, monitoring one or more aspects of network activity for an indication of network jamming may comprise determining one or more of: a number of active users in the network; and an amount of traffic in the network. Detecting, based on the monitored one or more aspects of network activity, that network jamming is occurring in the network may comprise determining that network jamming is occurring in the network when one or more of: the number of active users in the network is lower than an expected number of active users for a particular time; and the amount of traffic in the network is lower than an expected amount of traffic for the particular time. Detecting, based on the monitored one or more aspects of network activity, that network jamming is occurring in the network may comprise determining that network jamming is occurring in the network when one or more of: the number of active users in the network is higher than an expected number of active users for a particular time; and the amount of traffic in the network is higher than an expected amount of traffic for the particular time.

In certain embodiments, monitoring one or more aspects of network activity for an indication of network jamming may comprise determining that a number of transmissions by one or more wireless devices fail integrity protection, and detecting that network jamming is occurring in the network may comprise determining that the number of transmissions by the one or more wireless devices that fail integrity protection exceeds a threshold.

In certain embodiments, the method may comprise receiving, from a wireless device, a report indicating that the wireless device has detected one or more abnormal signals indicative of network jamming. The report may comprise one or more of: a type of measurement performed by the wireless device; a type of signal detected by the wireless device; a time a signal was detected by the wireless device; a date the signal was detected by the wireless device; an indication of a location of the wireless device; an indication of a frequency of the signal measured or detected by the wireless device; and a radio access type.

In certain embodiments, the method may comprise receiving one or more measurement reports from one or more wireless devices, and detecting that network jamming is occurring in the network based on the received one or more measurement reports from the one or more wireless devices. In certain embodiments, the method may comprise reporting the detected network jamming to one or more of: another network node; and a law enforcement authority.

Also disclosed is a network node. The network node comprises processing circuitry. The processing circuitry is configured to monitor one or more aspects of network activity for an indication of network jamming. The processing circuitry is configured to detect, based on the monitored one or more aspects of network activity, that network jamming is occurring in the network.

Certain embodiments of the present disclosure may provide one or more technical advantages. For example, certain embodiments may advantageously enable wireless devices and/or network nodes to be used to detect network jamming. As another example, certain embodiments may advantageously make network jamming less interesting for the attacker because jamming, even though not directly prevented by the network, is more easily detected by the network so that authorities can be alerted. As still another example, certain embodiments may advantageously allow the network operator to selectively deploy anti jamming mechanisms in particular circumstances (for example, if/when/where jamming is detected). Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
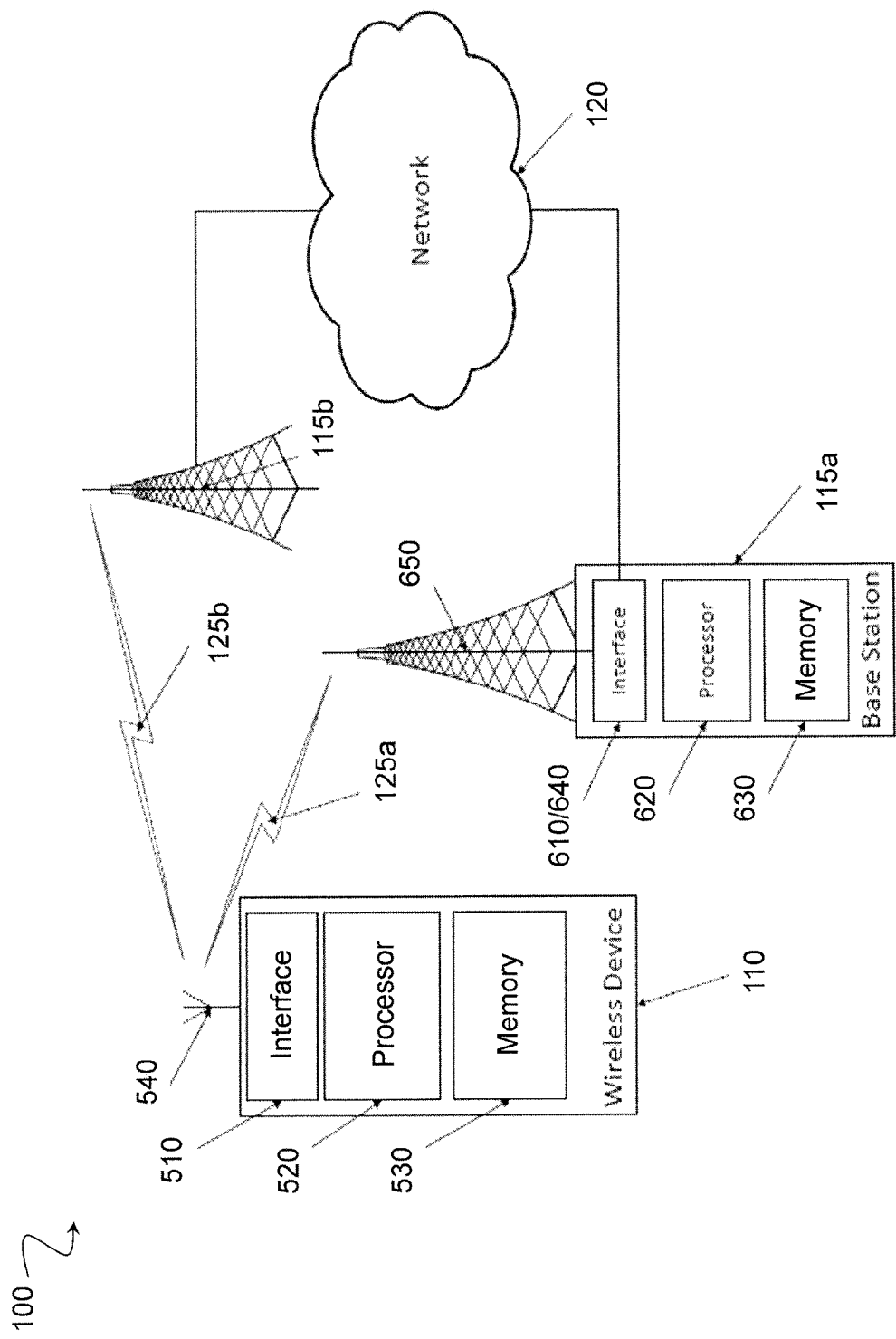
FIG. 1 is a block diagram illustrating an embodiment of a network, in accordance with certain embodiments.

As described above, there are a number of known techniques for providing resiliency towards network jamming, such as employing frequency hopping or other redundancy or diversity mechanisms to improve the success of the communication even with active jamming. A problem with using these mechanisms for combatting jamming in cellular networks is that they negatively influence the efficiency of the system. Thus, it may be infeasible or impractical for cellular networks to employ mechanisms for combatting jamming. The present disclosure contemplates various embodiments that may address these and other deficiencies associated with existing approaches by providing efficient mechanisms for detecting network jamming.

The mechanisms for detecting jamming described utilize various approaches. According to a first aspect, measurements are used to detect properties of jamming signals, which differ from non-jamming signals (useful signals). According to a second aspect, measurement reporting schemes are used in which one or more wireless devices (e.g., user equipment (UEs)) report to the network information about when, where, and what type of jamming signals have been detected. When used individually or in combination, the various embodiments described herein may advantageously allow a network operator and/or law enforcement authorities (e.g., police) to find and remove jammers.

According to one example embodiment, a method in a wireless device is disclosed. The wireless device monitors one or more aspects of signaling with a network for abnormal signals indicative of network jamming. The wireless device detects, based on the monitored one or more aspects of signaling with the network, one or more abnormal signals indicative of network jamming. In certain embodiments, the wireless device reports, to a network node of the network, that the wireless device has detected one or more abnormal signals indicative of network jamming. The reporting may occur at one or more of: upon detecting the one or more abnormal signals indicative of network jamming; and at a time when the wireless device regains connectivity to the network.

According to another example embodiment, a method in a network node is disclosed. The network node monitors one or more aspects of network activity for an indication of network jamming. The network node detects, based on the monitored one or more aspects of network activity, that network jamming is occurring in the network. In certain embodiments, the network node receives, from a wireless device, a report indicating that the wireless device has detected one or more abnormal signals indicative of network jamming. In certain embodiments, the network node reports the detected network jamming to one or more of: another network node; and a law enforcement authority.

Certain embodiments of the present disclosure may provide one or more technical advantages. For example, certain embodiments may advantageously enable wireless devices and/or network nodes to be used to detect network jamming. As another example, certain embodiments may advantageously make network jamming less interesting for the attacker because jamming, even though not directly prevented by the network, is more easily detected by the network so that law enforcement authorities can be alerted. As still another example, certain embodiments may advantageously allow the network operator to selectively deploy anti-jamming mechanisms in particular circumstances (for example, if/when/where jamming is detected). Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more wireless devices 110 and one or more network node(s) 115 (including network nodes 115a and 115b in the example embodiment of FIG. 1). Network node 115a comprises processor 620, memory 630, interface 610/640, and antenna 650. Similarly, wireless device 110 comprises processor 520, memory 530, interface 510 and antenna 540. These components may work together in order to provide network node and/or wireless device functionality, such as providing wireless connections in network 100.

For example, wireless devices 110 may communicate with network nodes 115 over a wireless interface. For example, wireless device 110 may transmit wireless signals 125a, 125b to one or more of network nodes 115, and/or receive wireless signals 125a, 125b from one or more of network nodes 115. Wireless signals 125a, 125b may contain voice traffic, data traffic, control signals, and/or any other suitable information. In some embodiments, an area of wireless signal coverage associated with a network node 115 may be referred to as a cell. In some embodiments, wireless device 110 may have device-to-device (D2D) capability. Thus, wireless devices 110 may be able to receive signals from and/or transmit signals directly to another wireless device.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of one or more Internet Protocol (IP) networks, public switched telephone networks (PSTNs), packet data networks, optical networks, public or private data networks, local area networks (LANs), wireless local area networks (WLANs), wired networks, wireless networks, metropolitan area networks (MANs), wide area networks (WAN), a local, regional, or global communication or computer network such as the Internet, an enterprise intranet, or any other suitable communication links, including combinations thereof, to enable communication between devices.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the RAN. In certain embodiments, network nodes 115 may interface with one or more network nodes over an internode interface, such as, for example, an X2 interface.

As described above, example embodiments of network 100 may include one or more wireless devices 110, and one or more different types of network nodes 115 capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, UEs such as smart phones. Further examples include wireless cameras, wireless-enabled tablet computers, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless device 110 may support D2D communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 1, wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 115 and/or other wireless devices. Wireless device 110 comprises processor 520, memory 530, interface 510, and antenna 540. The components of wireless device 110 are depicted as single boxes located within a single larger box, however in practice a wireless device may comprise multiple different physical components that make up a single illustrated component (e.g., memory 530 may comprise multiple discrete microchips, each microchip representing a portion of the total storage capacity).

Processor 520 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as memory 530, wireless device 110 functionality. Such functionality may include providing various wireless features discussed herein, including any of the features or benefits disclosed herein.

Memory 530 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Memory 530 may store any suitable data, instructions, or information, including software and encoded logic, utilized by wireless device 110. Memory 530 may be used to store any calculations made by processor 520 and/or any data received via interface 510.

Interface 510 may be used in the wireless communication of signalling and/or data between wireless device 110 and network nodes 115. For example, interface 510 may perform any formatting, coding, or translating that may be needed to allow wireless device 110 to send and receive data from network nodes 115 over a wireless connection. Interface 510 may also include a radio transmitter and/or receiver that may be coupled to or a part of antenna 540. The radio may receive digital data that is to be sent out to network nodes 115 via a wireless connection. The radio may convert the digital data into a radio signal having the appropriate channel and bandwidth parameters. The radio signal may then be transmitted via antenna 540 to network nodes 115.

Antenna 540 may be any type of antenna capable of transmitting and receiving data and/or signals wirelessly. In some embodiments, antenna 540 may comprise one or more omni-directional, sector or panel antennas operable to transmit/receive radio signals between, for example, 2 GHz and 66 GHz. In some embodiments, antenna 540 may be able to transmit/receive signals outside this range. As one example, an antenna 540 operating in a 5G system may support transmission/reception at lower frequencies (e.g., as low as 400 MHz). For simplicity, antenna 540 may be considered a part of interface 510 to the extent that a wireless signal is being used.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

In FIG. 1, network node 115a comprises processor 620, memory 630, interface 610/640, and antenna 650. These components are depicted as single boxes located within a single larger box. In practice however, network node 115a may comprise multiple different physical components that make up a single illustrated component (e.g., interface 610/640 may comprise terminals for coupling wires for a wired connection and a radio transceiver for a wireless connection). As another example, network node 115a may be a virtual network node in which multiple different physically separate components interact to provide the functionality of network node 115a (e.g., processor 620 may comprise three separate processors located in three separate enclosures, where each processor is responsible for a different function for a particular instance of network node 115a). Similarly, network node 115a may be composed of multiple physically separate components (e.g., a NodeB component and a RNC component, a BTS component and a BSC component, etc.), which may each have their own respective processor, storage, and interface components. In certain scenarios in which network node 115a comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115a may be configured to support multiple radio access technologies (RATs). In such embodiments, some components may be duplicated (e.g., separate memory 630 for the different RATs) and some components may be reused (e.g., the same antenna 650 may be shared by the RATs).

Processor 620 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115a components, such as memory 630, network node 115a functionality. For example, processor 620 may execute instructions stored in memory 630. Such functionality may include providing various wireless features discussed herein to one or more wireless devices, such as wireless device 110, including any of the features or benefits disclosed herein.

Memory 630 may comprise any form of volatile or non-volatile computer readable memory including, without limitation, persistent storage, solid state memory, remotely mounted memory, magnetic media, optical media, RAM, ROM, removable media, or any other suitable local or remote memory component. Memory 630 may store any suitable instructions, data or information, including software and encoded logic, utilized by network node 115a. Memory 630 may be used to store any calculations made by processor 620 and/or any data received via interface 610/640.

Network node 115a also comprises interface 610/640 which may be used in the wired or wireless communication of signalling and/or data between network node 115a, network 115b, and/or wireless device 110. For example, interface 610/640 may perform any formatting, coding, or translating that may be needed to allow network node 115a to send and receive data from network 115b over a wired connection. Interface 610/640 may also include a radio transmitter and/or receiver that may be coupled to or a part of antenna 650. The radio may receive digital data that is to be sent out to other network nodes or wireless devices via a wireless connection. The radio may convert the digital data into a radio signal having the appropriate channel and bandwidth parameters. The radio signal may then be transmitted via antenna 650 to the appropriate recipient (e.g., wireless device 110).

Antenna 650 may be any type of antenna capable of transmitting and receiving data and/or signals wirelessly. In some embodiments, antenna 650 may comprise one or more omni-directional, sector or panel antennas operable to transmit/receive radio signals between, for example, 2 GHz and 66 GHz. In some embodiments, antenna 650 may be able to transmit/receive signals outside this range. As one example, an antenna 650 operating in a 5G system may support transmission/reception at lower frequencies (e.g., as low as 400 MHz). An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, the term "radio node" is used generically to refer both to wireless devices and network nodes, as each is respectively described above.

The terminology such as network node and wireless device should be considered non-limiting and does in particular not imply a certain hierarchical relation between the two; in general "network node" could be considered as device 1 and "wireless device" device 2, and these two devices communicate with each other over some radio channel.

Example embodiments of wireless device 110, network nodes 115, and other network nodes (such as radio network controller or core network node) are described in more detail below with respect to FIGS. 4-9.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In different embodiments, the wireless network 100 may comprise any number of wired or wireless networks, network nodes, base stations, controllers, wireless devices, relay stations, and/or any other components that may facilitate or participate in the communication of data and/or signals whether via wired or wireless connections.

Furthermore, although certain embodiments may be described as implemented in a NR network, the embodiments may be implemented in any appropriate type of telecommunication system using any suitable components, and are applicable to any RAT or multi-RAT systems in which a wireless device receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable RAT, or any suitable combination of one or more RATs. Thus, network 100 may represent any type of communication, telecommunication, data, cellular, and/or radio network or other type of system. In particular embodiments, the network 100 may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Although certain embodiments may be described in the context of wireless transmissions in the downlink (DL), the present disclosure contemplates that the various embodiments are equally applicable in the uplink (UL).

Although the solutions described herein may be implemented in any appropriate type of system using any suitable components, particular embodiments of the described solutions may be implemented in a wireless network such as the example wireless communication network illustrated in FIG. 1. In the example embodiment of FIG. 1, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

As described above, there are a number of known techniques for providing resiliency towards network jamming, such as employing frequency hopping or other redundancy or diversity mechanisms to improve the success of communication even with active jamming. Resilience towards jamming is something which today is mainly supported by military systems (e.g., using frequency hopping over a large set of frequencies, making jamming attacks less effective). For civilian cellular systems, however, such solutions are not very practical due to the limited available spectrum and the overall negative influence on the efficiency of the system For this reason, it may be impractical to provide effective resilience methods against, for example, high power jamming signalling in the vicinity of the receiver. That is, it may not be practical to provide protection against high power jamming signals in the vicinity of the receiver for civilian use.

There are, however, practical approaches to providing resilience against jamming that could be considered. These include, for example, network detection of jamming (including both UL and DL), as well as resilience against low power jamming (e.g., where specific network characteristics are abused to provide denial of service (DoS)).

Network detection of jamming can be useful since it enables the network operator and law enforcement authorities to take action to search for and stop unlawful jamming. Detection methods in the UL could be based on proprietary mechanisms such as observing abnormal traffic patterns, increased interference levels, increased Block Error Rate (BER), etc. In the DL, it may be possible to detect jamming indirectly by, for example, UE reporting, similar to what has been done for MDT. The UE could, for instance report if and where it detects abnormal signals (e.g., signals (power) without the corresponding pilots, or pilots without the corresponding sys-info, or cells which are not possible to access, or does not provide the right security certificates although claiming to be an operator cell). These reports can be used by the network operator to detect ongoing jamming.

Additionally, to the mechanism above, approaches can be considered where the majority of UL and/or DL traffic/signalling are signed using some secure checksum (e.g., integrity Message Authentication Code (MAC), secure Cyclic Redundancy Check (CRC)). This would make it easier to prevent data injection/modification and could make jamming detection easier since jamming or DoS attacks will most likely lead to increased rates of received erroneous checksums. Careful consideration is needed, however, to avoid overhead and performance degradation due to such security mechanism.

There may be different jamming scenarios that may have different requirements/solutions. In some cases, it may not be possible or practical to prevent jamming, in which case it may be desirable to stop or limit jamming detection. Similarly, jamming detection could be have different levels in which if jamming is suspected more or different jamming detection mechanisms are triggered.

According to one example embodiment, a method in wireless device 110 is disclosed. Although wireless device 110 does not see what other wireless devices are doing or receive all the same information that, for example, network node 115 receives, wireless device 110, may be able to detect jamming by detecting abnormal signals, such as abnormal signals from the network or that appear to be from the network (e.g., signals that occupy the frequency/time slots used by the network).

In certain embodiments, wireless device 110 monitors one or more aspects of signaling with a network (e.g., network 100) for abnormal signals indicative of network jamming. Wireless device 110 may monitor the one or more aspects of signaling with network in any suitable manner, for example using one or more measurements of signals received from the network or by monitoring characteristics of interactions with the network, as described in more detail below. Wireless device 110 detects, based on the monitored one or more aspects of signaling with network 100, one or more abnormal signals indicative of network jamming.

As a first example, wireless device 110 may monitor one or more aspects of signaling with the network for abnormal signals indicative of network jamming by measuring one or more transmissions in a frequency band used by an operator of network 100 that are not associated with any normal pilots or reference signals. The measurements may be any suitable measurements. As one non-limiting example, the measurements may be measurements of the received power of the one or more transmissions.

As a second example, wireless device 110 may monitor one or more aspects of signalling with the network for abnormal signals indicative of network jamming by measuring one or more transmissions in a frequency band used by an operator of network 100 that are associated with one or more of a known pilot signal and a known reference signal. In some cases, those signals do not provide any system information that make it possible for wireless device 110 to access network 100. In such a scenario, wireless device 110 may detect, based on the monitored one or more aspects of signaling with the network, the one or more abnormal signals indicative of network jamming by determining that the one or more transmissions do not provide system information enabling wireless device 110 to access the network.

As a third example, wireless device 110 may monitor one or more aspects of signalling with the network for abnormal signals indicative of network jamming by measuring one or more transmissions in a frequency band used by an operator of network 100 that are associated with one or more of a known pilot signal and a known reference signal. In some cases, those signals do provide system information (in contrast to the second example described above) making it possible for the UR to access the network, but either the system information: is not providing the right security parameters (e.g., signatures, authentication codes, etc.); contains some other errors that are not consistent with wireless device configuration; or where wireless device 110 has attempted to access the network using the provided system information but where the access fails (possibly after a certain number of attempts). In such a scenario, wireless device 110 may detect, based on the monitored one or more aspects of signaling with the network, the one or more abnormal signals indicative of network jamming by determining that the one or more transmissions provide system information enabling the wireless device to access the network and one or more of the following conditions are met: the system information does not provide a correct security parameters; the system information includes one or more errors that are not consistent with a configuration of the wireless device; and a threshold number of access attempts by the wireless device using the provided system information have failed.

As a fourth example, in some cases wireless device 110 may be able to access a network, but when performing authentication to the accessed network the network fails to authenticate itself to wireless device 110, for example because the accessed network could be a false network. In such a scenario, wireless device 110 may detect, based on the monitored one or more aspects of signalling with the network, the one or more abnormal signals indicative of network jamming by determining that the network fails to authenticate itself to wireless device 110 after wireless device 110 accesses the network.

As a fifth example, in some cases wireless device 110 may receive signals from the cellular network that do not contain the right security checksums (or the number of erroneous detecting checksums exceed a threshold). Thus, in certain embodiments wireless device 110 may detect the one or more abnormal signals indicative of network jamming by determining that a number of received signals that do not contain a correct security checksum exceeds a threshold value.

If the wireless device has detected one or more abnormal signals indicative of network jamming, it can report this to the network. In certain embodiments, wireless device 110 may report, to a network node (e.g., network node 115a or another network node 115 in network 100) that wireless device 110 has detected one or more abnormal signals indicative of network jamming. The report may include any suitable information. Examples of information that may be included in or indicated by the report include, but are not limited to, a type of measurement performed by wireless device 110; a type of signal detected by wireless device 110 (e.g., just power, power with pilots, power with pilots with system info); a time a signal was detected by wireless device 110; a date the signal was detected by wireless device 110; an indication of a location of wireless device 110 (e.g., an indication of which cell wireless device 110 was in, or the Global Positioning System (GPS) coordinates of wireless device 110); an indication of a frequency of the signal measured or detected by wireless device 110; a radio access type; and any other suitable information related to the radio network that may be relevant (e.g., frequencies, radio access types, etc.).

The reporting can occur at any suitable time. In some cases, for example, wireless device 110 may be actively denied service due to the jamming. Thus, the reporting may occur at a later stage when wireless device 110 has obtained connectivity to the correct network (e.g., a network which is authenticated against the wireless device). Thus, wireless device 110 may report that it has detected one or more abnormal signals indicative of network jamming at one or more of: upon detecting the one or more abnormal signals indicative of network jamming; and at a time when the wireless device regains connectivity to the network.

In some cases, wireless device 110 may send one or more measurement reports to one or more network nodes 115 for use by the network nodes 115 or another network node to detect jamming (e.g. by correlating its own transmissions with the transmissions reported by the wireless device 110).

According to another example embodiment, a method in a network node 115 (e.g., network node 115a) is disclosed. The method in which network node 115a can detect network jamming is mainly based on discovering abnormal traffic, or interference, or behavior of one or more wireless devices 110. Network node 115a monitors one or more aspects of network activity for an indication of network jamming. Network node 115a may monitor the one or more aspects of the network activity for an indication of network jamming in any suitable manner, as described in more detail below. Network node 115a detects, based on the monitored one or more aspects of network activity, that network jamming is occurring in the network.

As a first example, network node 115a may monitor one or more aspects of network activity for an indication of network jamming by determining whether a number of wireless devices 110 are requesting one or more channels that are subsequently not used. This can happen in normal network operations as well, but if the number of such events exceeds a configured threshold network node 115a could assume jamming is occurring. Network node 115a may detect that network jamming is occurring in network 100 if it determines that the number of wireless devices 110 requesting the one or more channels that are subsequently not used exceeds a threshold value.

As a second example, network node 115a may monitor one or more aspects of network activity for an indication of network jamming by monitoring an interference level in network 100. Network node 115a may detect that network jamming is occurring in network 100 when it determines that the interference level in network 100 is above a threshold value. The levels of interference in the network may be monitored in any suitable manner. As one example, high levels of interference can be detected directly (e.g., by network node 115a). As another example, high levels of interference can be detected indirectly (e.g., due to increased Block Errors occurring with transmissions of wireless devices 110, or that wireless devices 110 report poor link measurements). In some cases, historical rates may be maintained and compared against current error rates to detect high levels of interference.

As a third example, network node 115a may monitor one or more aspects of network activity for an indication of network jamming by determining one or more of: a number of active users in network 100; and an amount of traffic in network 100. Detecting a low number of active users or traffic in a certain area that normally has high traffic load or active users during similar times (e.g., time of day, weekends/weekdays) may be indicative of network jamming. Thus, network node 115a may, in some cases, detect, based on the monitored one or more aspects of network activity, that network jamming is occurring in the network when it determines one or more of: that the number of active users in network 100 is lower than an expected number of active users for a particular time; and the amount of traffic in network 100 is lower than an expected amount of traffic for the particular time. The expected number of active users for a particular time or the expected amount of traffic for the particular time may be based on historical values of active users and traffic during comparable periods of time.

As a fourth example, network node 115a may monitor one or more aspects of network activity for an indication of network jamming by determining one or more of: a number of active users in network 100; and an amount of traffic in network 100. Detecting a high number of active users or traffic in a certain area that normally has low traffic load or active users during similar times (e.g., time of day, weekends/weekdays) may be indicative of network jamming. Thus, network node 115a may, in some cases, detect, based on the monitored one or more aspects of network activity, that network jamming is occurring in the network when it determines that one or more of: the number of active users in network 100 is higher than an expected number of active users for a particular time; and the amount of traffic in network 100 is higher than an expected amount of traffic for the particular time. As described above, the expected number of active users for a particular time or the expected amount of traffic for the particular time may be based on historical values of active users and traffic during comparable periods of time.

As a fifth example, network node 115a may monitor one or more aspects of network activity for an indication of network jamming by determining whether a number of transmissions by one or more wireless devices 110 fail integrity protection. Some wireless device transmissions (such as signalling) typically include an integrity protection checksum to prevent manipulation. Detecting a higher number of transmissions that fail integrity protection checksums may be indicative of network jamming. Thus, network node 115a may detect that network jamming is occurring in network 100 if it determines that the number of transmissions by the one or more wireless devices 110 that fail integrity protection exceeds a threshold amount.

In some cases, network node 115a may receive, from one or more wireless devices 110, a report indicating that the one or more wireless devices 110 have detected one or more abnormal signals indicative of network jamming. As described above, the report may include any suitable information, including but not limited to: a type of measurement performed by wireless device 110; a type of signal detected by wireless device 110; a time a signal was detected by wireless device 110; a date the signal was detected by wireless device 110; an indication of a location of wireless device 110; an indication of a frequency of the signal measured or detected by wireless device 110; and a radio access type. In some cases, network node 115a may receive one or more measurement reports from one or more wireless devices 110 and detect that network jamming is occurring in network 100 based on the received one or more measurement reports from the one or more wireless devices 110.

In certain embodiments, network node 115a reports the detected network jamming to one or more of: another network node; and a law enforcement authority. In certain embodiments, a network operator may deploy anti jamming mechanisms based on information reported by network node 115 (e.g., if/when/where jamming is detected). Examples of anti-jamming mechanisms that could be deployed include, but are not limited to, using more transmission power and/or transmitting with more robust coding (at a lower data rate) to advantageously ensure basic service is provided. Additional examples include using one or more diversity mechanisms such as frequency hopping (or moving wireless devices 110 to a different frequency), data repetitions/retransmissions, antenna diversity, or any other suitable anti-jamming mechanisms.

Figure 2:
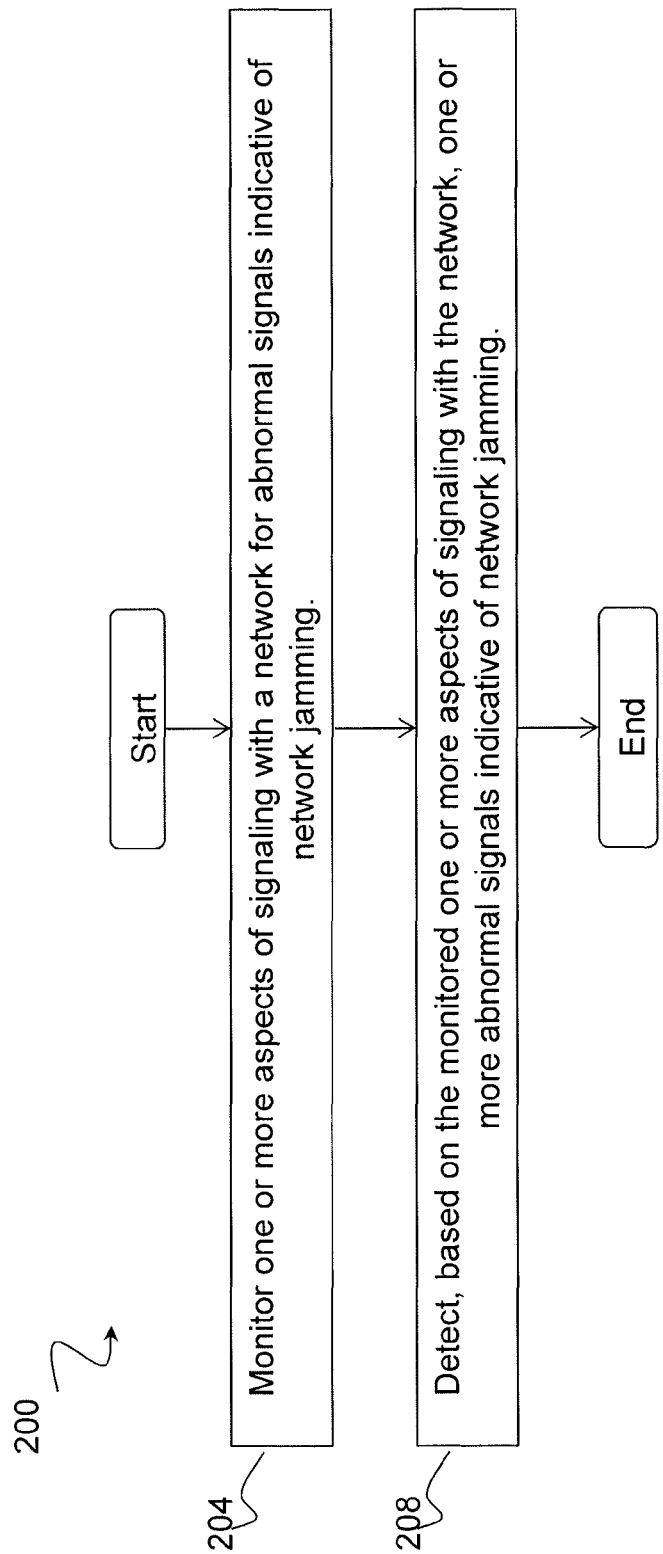
FIG. 2 is a flow diagram of a method in a user equipment (UE), in accordance with certain embodiments.

FIG. 2 is a flow diagram of a method 200 in a wireless device, in accordance with certain embodiments. Method 200 begins at step 204, where the wireless device monitors one or more aspects of signaling with a network for abnormal signals indicative of network jamming. In certain embodiments, monitoring one or more aspects of signaling with the network for abnormal signals indicative of network jamming may comprise measuring one or more transmissions in a frequency band used by an operator of the network that are not associated with one or more of: a known pilot signal; and a known reference signal. In certain embodiments, monitoring one or more aspects of signaling with the network for abnormal signals indicative of network jamming may comprise measuring one or more transmissions in a frequency band used by an operator of the network that are associated with one or more of: a known pilot signal; and a known reference signal.

At step 208, the wireless device detects, based on the monitored one or more aspects of signaling with the network, one or more abnormal signals indicative of network jamming. In certain embodiments, detecting, based on the monitored one or more aspects of signaling with the network, the one or more abnormal signals indicative of network jamming may comprise determining that the one or more transmissions do not provide system information enabling the wireless device to access the network. In certain embodiments, detecting, based on the monitored one or more aspects of signaling with the network, the one or more abnormal signals indicative of network jamming may comprise determining that the one or more transmissions provide system information enabling the wireless device to access the network and one or more of the following conditions are met: the system information does not provide a correct security parameters; the system information includes one or more errors that are not consistent with a configuration of the wireless device; and a threshold number of access attempts by the wireless device using the provided system information have failed.

In certain embodiments, detecting, based on the monitored one or more aspects of signaling with the network, the one or more abnormal signals indicative of network jamming may comprise determining that the network fails to authenticate itself to the wireless device after the wireless device accesses the network. In certain embodiments, detecting, based on the monitored one or more aspects of signaling with the network, the one or more abnormal signals indicative of network jamming may comprise determining that a number of received signals that do not contain a correct security checksum exceeds a threshold value.

In certain embodiments, method 200 may comprise reporting, to a network node of the network, that the wireless device has detected one or more abnormal signals indicative of network jamming. The report may comprise one or more of: a type of measurement performed by the wireless device; a type of signal detected by the wireless device; a time a signal was detected by the wireless device; a date the signal was detected by the wireless device; an indication of a location of the wireless device; an indication of a frequency of the signal measured or detected by the wireless device; and a radio access type. The reporting may occur at one or more of: upon detecting the one or more abnormal signals indicative of network jamming; and at a time when the wireless device regains connectivity to the network.

In certain embodiments, method 200 may comprise sending one or more measurement reports to a network node for use by the network node or another network node to detect network jamming.

Figure 3:
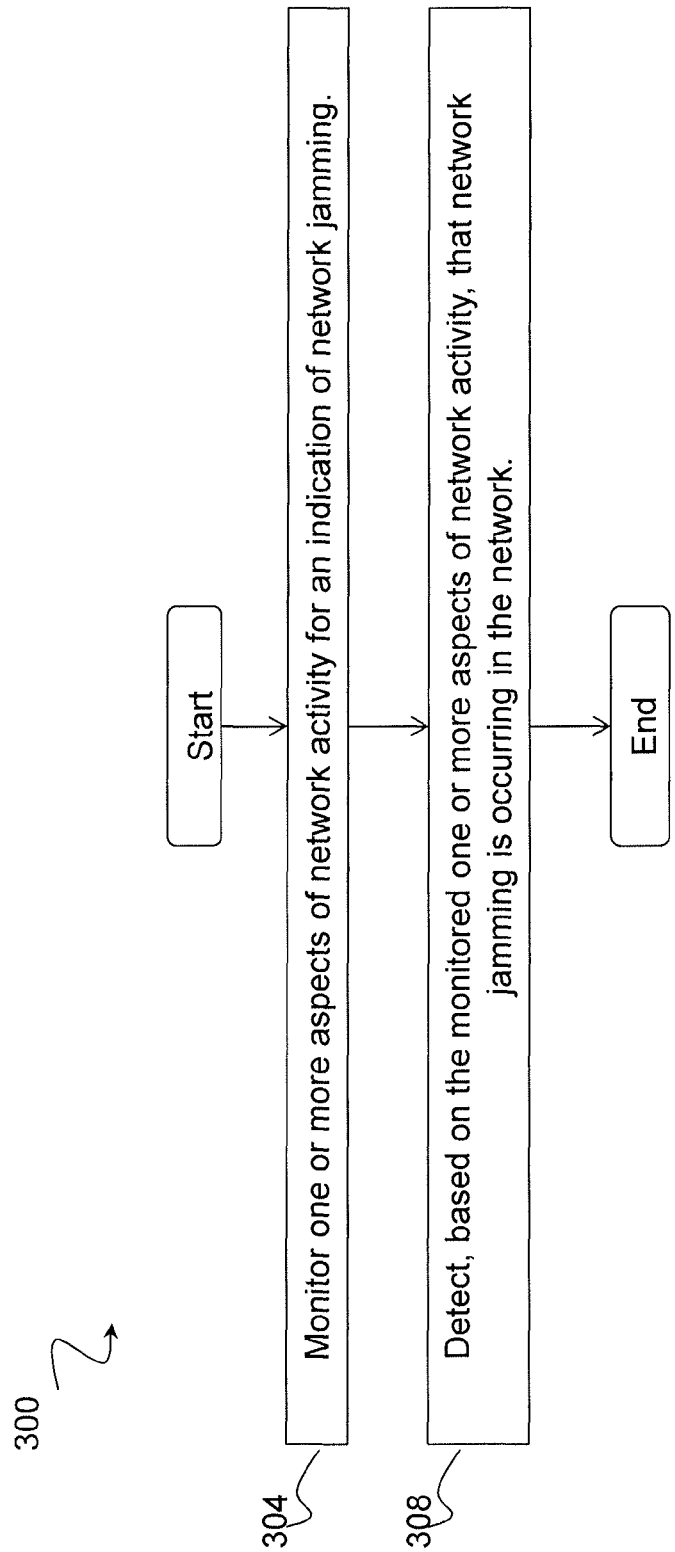
FIG. 3 is a flow diagram of a method in a network node, in accordance with certain embodiments.

FIG. 3 is a flow diagram of a method in a network node, in accordance with certain embodiments. Method 300 begins at step 304, where the network node monitors one or more aspects of network activity for an indication of network jamming. At step 308, the network node detects, based on the monitored one or more aspects of network activity, that network jamming is occurring in the network.

In certain embodiments, monitoring one or more aspects of network activity for an indication of network jamming may comprise determining that a number of wireless devices are requesting one or more channels that are subsequently not used, and detecting that network jamming is occurring in the network may comprise determining that the number of wireless devices requesting the one or more channels that are subsequently not used exceeds a threshold value.

In certain embodiments, monitoring one or more aspects of network activity for an indication of network jamming may comprise monitoring an interference level in the network, and detecting that network jamming is occurring in the network may comprise determining that the interference level in the network is above a threshold value.

In certain embodiments, monitoring one or more aspects of network activity for an indication of network jamming may comprise determining one or more of: a number of active users in the network; and an amount of traffic in the network. Detecting, based on the monitored one or more aspects of network activity, that network jamming is occurring in the network may comprise determining that network jamming is occurring in the network when one or more of: the number of active users in the network is lower than an expected number of active users for a particular time; and the amount of traffic in the network is lower than an expected amount of traffic for the particular time. Detecting, based on the monitored one or more aspects of network activity, that network jamming is occurring in the network may comprise determining that network jamming is occurring in the network when one or more of: the number of active users in the network is higher than an expected number of active users for a particular time; and the amount of traffic in the network is higher than an expected amount of traffic for the particular time.

In certain embodiments, monitoring one or more aspects of network activity for an indication of network jamming may comprise determining that a number of transmissions by one or more wireless devices fail integrity protection, and detecting that network jamming is occurring in the network comprises determining that the number of transmissions by the one or more wireless devices that fail integrity protection exceeds a threshold.

In certain embodiments, method 300 may comprise receiving, from a wireless device, a report indicating that the wireless device has detected one or more abnormal signals indicative of network jamming. The report may comprise one or more of: a type of measurement performed by the wireless device; a type of signal detected by the wireless device; a time a signal was detected by the wireless device; a date the signal was detected by the wireless device; an indication of a location of the wireless device; an indication of a frequency of the signal measured or detected by the wireless device; and a radio access type.

In certain embodiments, method 300 may comprise receiving one or more measurement reports from one or more wireless devices, and detecting that network jamming is occurring in the network based on the received one or more measurement reports from the one or more wireless devices. In certain embodiments, method 300 may comprise reporting the detected network jamming to one or more of: another network node; and a law enforcement authority.

Figure 4:
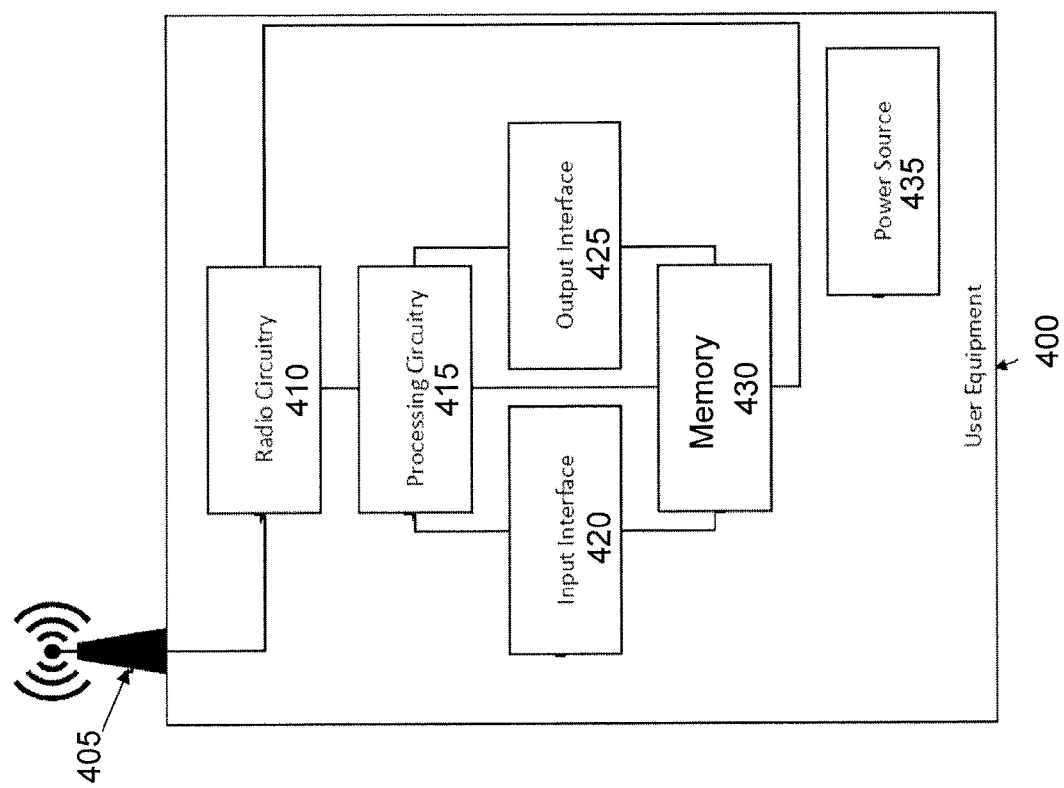
FIG. 4 is a block schematic of an exemplary UE, in accordance with certain embodiments.

FIG. 4 is a block schematic of an exemplary UE, in accordance with certain embodiments. As shown in FIG. 4, UE 400 is an example wireless device 110 described above. UE 400 includes an antenna 405, radio front-end circuitry 410, processing circuitry 415, and a computer-readable storage medium 430. Antenna 405 may include one or more antennas or antenna arrays, and is configured to send and/or receive wireless signals, and is connected to radio front-end circuitry 410. In certain alternative embodiments, wireless device 400 may not include antenna 405, and antenna 405 may instead be separate from wireless device 400 and be connectable to wireless device 400 through an interface or port.

The radio front-end circuitry 410 may comprise various filters and amplifiers, is connected to antenna 405 and processing circuitry 415, and is configured to condition signals communicated between antenna 405 and processing circuitry 415. In certain alternative embodiments, UE 400 may not include radio front-end circuitry 410, and processing circuitry 415 may instead be connected to antenna 405 without radio front-end circuitry 410.

Processing circuitry 415 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 415 executing instructions stored on a computer-readable storage medium 430. In alternative embodiments, some or all of the functionality may be provided by the processing circuitry 415 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 415 alone or to other components of UE 400, but are enjoyed by the UE as a whole, and/or by end users and the wireless network generally.

Antenna 405, radio front-end circuitry 410, and/or processing circuitry 415 may be configured to perform any receiving operations described herein as being performed by a UE or wireless device. Any information, data and/or signals may be received from a network node and/or another wireless device.

The processing circuitry 415 may be configured to perform any determining operations described herein as being performed by a wireless device. Determining as performed by processing circuitry 415 may include processing information obtained by the processing circuitry 415 by, for example, converting the obtained information into other information, comparing the obtained information or converted information to information stored in the wireless device, and/or performing one or more operations based on the obtained information or converted information, and as a result of said processing making a determination.

Antenna 405, radio front-end circuitry 410, and/or processing circuitry 415 may be configured to perform any transmitting operations described herein as being performed by a wireless device. Any information, data and/or signals may be transmitted to a network node and/or another wireless device.

Computer-readable storage medium 430 is generally operable to store instructions, such as a computer program, software, an application including one or more of logic, rules, code, tables, etc. and/or other instructions capable of being executed by a processor. Examples of computer-readable storage medium 430 include computer memory (for example, RAM or ROM), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 415. In some embodiments, processing circuitry 415 and computer-readable storage medium 430 may be considered to be integrated.

Alternative embodiments of UE 400 may include additional components beyond those shown in FIG. 4 that may be responsible for providing certain aspects of the UE's functionality, including any of the functionality described herein and/or any functionality necessary to support the solution described above. As just one example, UE 400 may include input interfaces, devices and circuits 420, and output interfaces, devices and circuits 425. Input interfaces, devices, and circuits 420 are configured to allow input of information into UE 400, and are connected to processing circuitry 415 to allow processing circuitry 415 to process the input information. For example, input interfaces, devices, and circuits 420 may include a microphone, a proximity or other sensor, keys/buttons, a touch display, one or more cameras, a USB port, or other input elements. Output interfaces, devices, and circuits 425 are configured to allow output of information from UE 400, and are connected to processing circuitry 415 to allow processing circuitry 415 to output information from UE 400. For example, output interfaces, devices, or circuits 425 may include a speaker, a display, vibrating circuitry, a USB port, a headphone interface, or other output elements. Using one or more input and output interfaces 420, 425, devices, and circuits, UE 300 may communicate with end users and/or the wireless network, and allow them to benefit from the functionality described herein.

As another example, UE 400 may include power source 435. Power source 435 may comprise power management circuitry. Power source 435 may receive power from a power supply, which may either be comprised in, or be external to, power source 435. For example, UE 400 may comprise a power supply in the form of a battery or battery pack which is connected to, or integrated in, power source 435. Other types of power sources, such as photovoltaic devices, may also be used. As a further example, UE 400 may be connectable to an external power supply (such as an electricity outlet) via an input circuitry or interface such as an electrical cable, whereby the external power supply supplies power to power source 435. Power source 435 may be connected to radio front-end circuitry 410, processing circuitry 415, and/or computer-readable storage medium 430 and be configured to supply UE 400, including processing circuitry 415, with power for performing the functionality described herein.

UE 400 may also include multiple sets of processing circuitry 415, computer-readable storage medium 430, radio circuitry 410, and/or antenna 405 for different wireless technologies integrated into wireless device 400, such as, for example, GSM, WCDMA, LTE, NR, WiFi, or Bluetooth wireless technologies. These wireless technologies may be integrated into the same or different chipsets and other components within wireless device 400.

Figure 5:
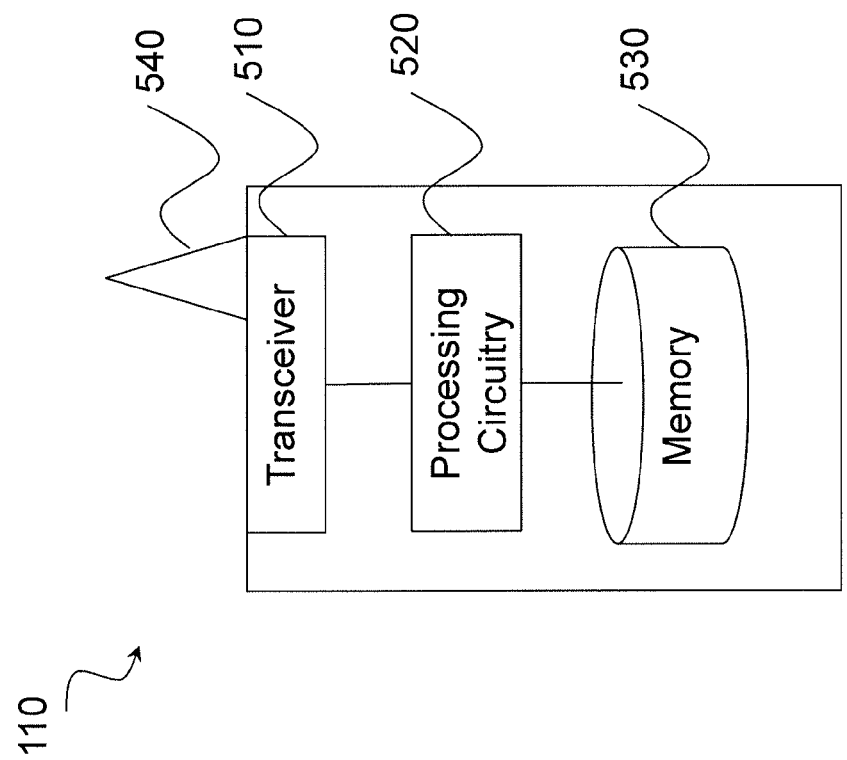
FIG. 5 is a block schematic of an exemplary wireless device, in accordance with certain embodiments.

FIG. 5 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a MTC device/M2M device, LEE, LME, USB dongles, a D2D capable device, or another device that can provide wireless communication. A wireless device 110 may also be referred to as UE, a station (STA), a device, or a terminal in some embodiments. Wireless device 110 includes transceiver 510, processing circuitry 520, and memory 530. In some embodiments, transceiver 510 facilitates transmitting wireless signals to and receiving wireless signals from network node 115 (e.g., via antenna 540), processing circuitry 520 executes instructions to provide some or all of the functionality described above as being provided by wireless device 110, and memory 530 stores the instructions executed by processing circuitry 520.

Processing circuitry 520 may include any suitable combination of hardware and software implemented in one or more modules to execute instructions and manipulate data to perform some or all of the described functions of wireless device 110, such as the functions of wireless device 110 described above in relation to FIGS. 1-3. In some embodiments, processing circuitry 520 may include, for example, one or more computers, one or more CPUs, one or more microprocessors, one or more applications, one or more ASICs, one or more FPGAs and/or other logic.

Memory 530 is generally operable to store instructions, such as a computer program, software, an application including one or more of logic, rules, algorithms, code, tables, etc. and/or other instructions capable of being executed by processing circuitry 520. Examples of memory 530 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information, data, and/or instructions that may be used by processing circuitry 520.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
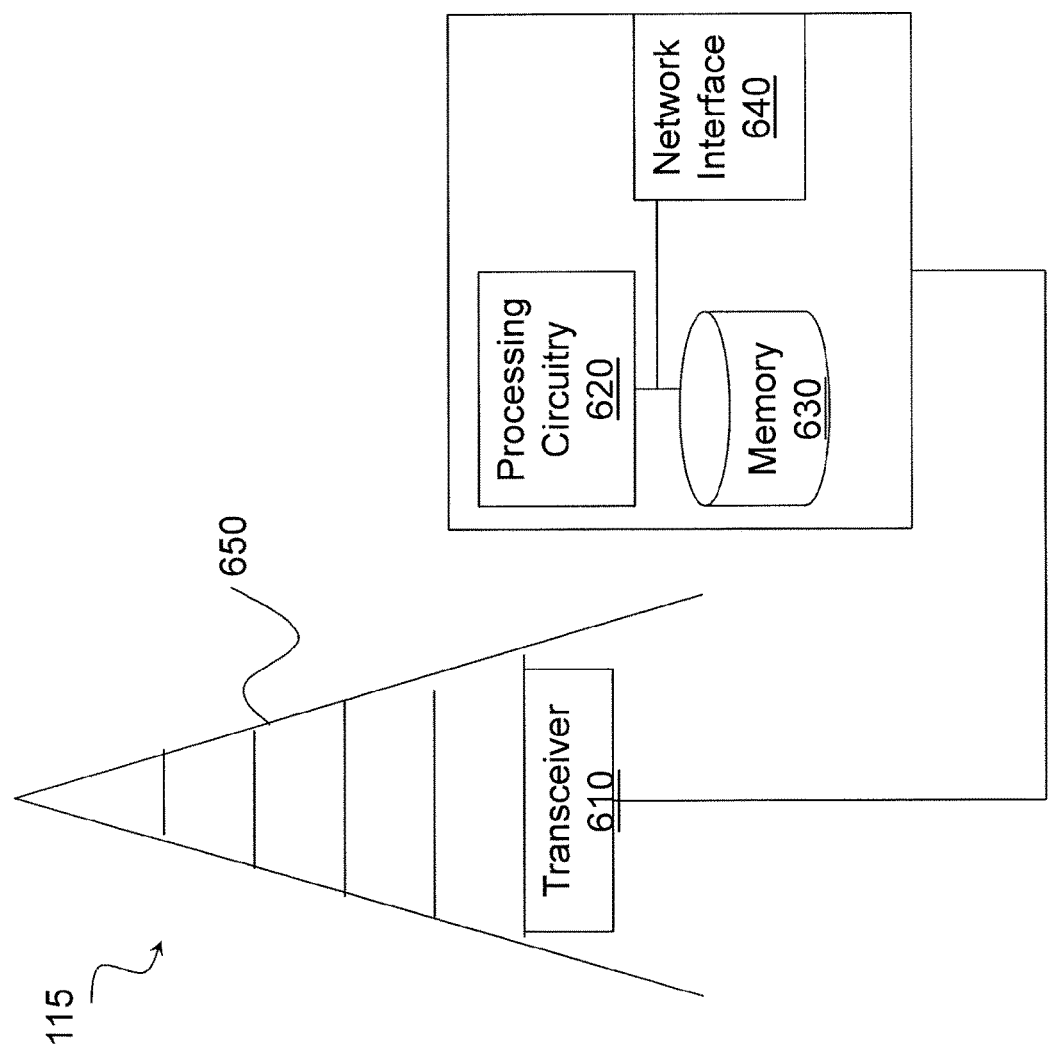
FIG. 6 is a block schematic of an exemplary network node, in accordance with certain embodiments.

FIG. 6 is a block schematic of an exemplary network node 115, in accordance with certain embodiments. Network node 115 may be any type of radio network node or any network node that communicates with a wireless device and/or with another network node. Examples of network node 115 include an eNodeB, a gNB, a node B, a BS, a wireless AP (e.g., a Wi-Fi AP), a low power node, a BTS, relay, donor node controlling relay, transmission points, transmission nodes, RRU, RRH, MSR radio node such as MSR BS, nodes in DAS, O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 610, processing circuitry 620, memory 630, and network interface 640. In some embodiments, transceiver 610 facilitates transmitting wireless signals to and receiving wireless signals from wireless device 110 (e.g., via antenna 650), processing circuitry 620 executes instructions to provide some or all of the functionality described above as being provided by a network node 115, memory 630 stores the instructions executed by processing circuitry 620, and network interface 640 communicates signals to backend network components, such as a gateway, switch, router, Internet, Public Switched Telephone Network (PSTN), core network nodes or radio network controllers 130, etc.

Processing circuitry 620 may include any suitable combination of hardware and software implemented in one or more modules to execute instructions and manipulate data to perform some or all of the described functions of network node 115, such as those described above in relation to FIGS. 1-3. In some embodiments, processing circuitry 620 may include, for example, one or more computers, one or more CPUs, one or more microprocessors, one or more ASICs, one or more FPGAs, one or more applications, and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 115, send output from network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 115 may include additional components beyond those shown in FIG. 6 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 7:
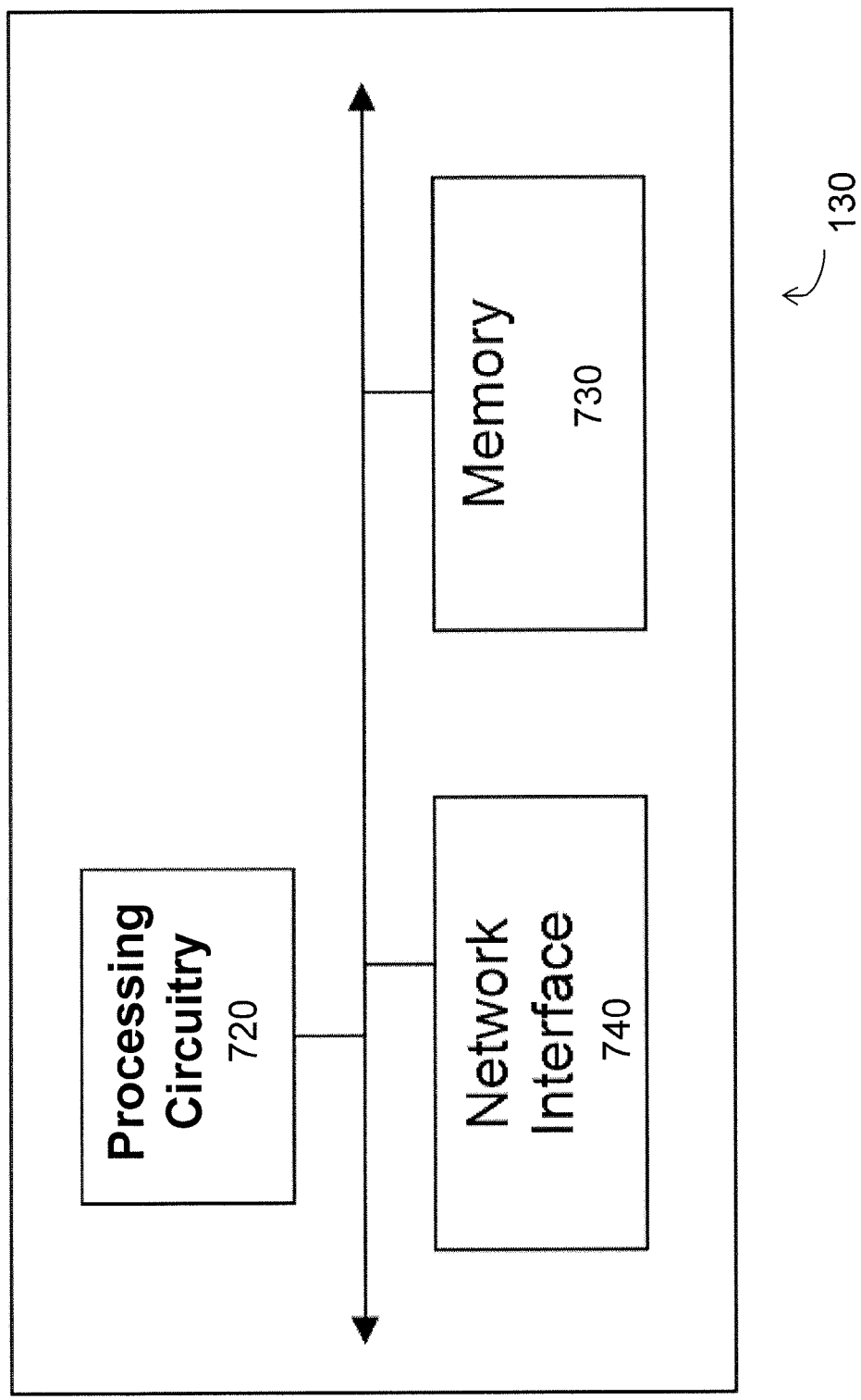
FIG. 7 is a block schematic of an exemplary radio network controller or core network node, in accordance with certain embodiments.

FIG. 7 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 720, memory 730, and network interface 740. In some embodiments, processing circuitry 720 executes instructions to provide some or all of the functionality described above as being provided by the network node, memory 730 stores the instructions executed by processing circuitry 720, and network interface 740 communicates signals to any suitable node, such as a gateway, switch, router, Internet, PSTN, network nodes 115, radio network controllers or core network nodes 130, etc.

Processing circuitry 720 may include any suitable combination of hardware and software implemented in one or more modules to execute instructions and manipulate data to perform some or all of the described functions of the radio network controller or core network node 130. In some embodiments, processing circuitry 720 may include, for example, one or more computers, one or more CPUs, one or more microprocessors, one or more ASICs, one or more FPGAs, one or more applications, and/or other logic.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the network node's functionality, including any of the functionality described above and/or any additional functionality (including any functionality necessary to support the solution described above).

Figure 8:
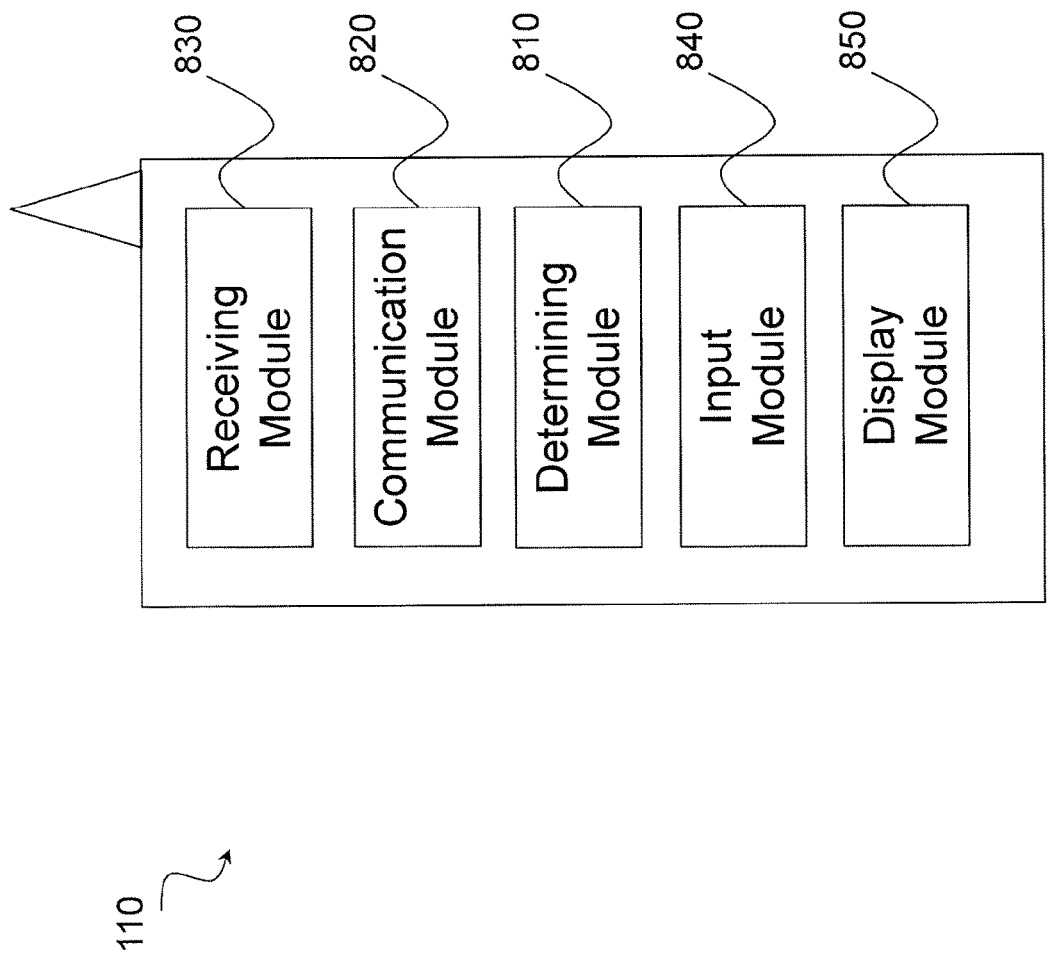
FIG. 8 is a block schematic of an exemplary wireless device, in accordance with certain embodiments.

FIG. 8 is a schematic block diagram of an exemplary wireless device, in accordance with certain embodiments. Wireless device 110 may include one or more modules. For example, wireless device 110 may include a determining module 810, a communication module 820, a receiving module 830, an input module 840, a display module 850, and any other suitable modules. In some embodiments, one or more of determining module 810, communication module 820, receiving module 830, input module 840, display module 850, or any other suitable module may be implemented using one or more processors, such as processing circuitry 520 described above in relation to FIG. 5. In certain embodiments, the functions of two or more of the various modules may be combined into a single module. Wireless device 110 may perform the methods for detecting network jamming described above in relation to FIGS. 1-3.

Determining module 810 may perform the processing functions of wireless device 110. For example, determining module 810 may monitor one or more aspects of signaling with a network for abnormal signals indicative of network jamming. As another example, determining module 810 may detect, based on the monitored one or more aspects of signaling with the network, one or more abnormal signals indicative of network jamming. As still another example, determining module 810 may measure one or more transmissions in a frequency band used by an operator of the network that are not associated with one or more of: a known pilot signal; and a known reference signal. As yet another example, determining module 810 may measure one or more transmissions in a frequency band used by an operator of the network that are associated with one or more of: a known pilot signal; and a known reference signal. As another example, determining module 810 may determine that the one or more transmissions do not provide system information enabling the wireless device to access the network. As another example, determining module 810 may determine that the one or more transmissions provide system information enabling the wireless device to access the network and one or more of the following conditions are met: the system information does not provide a correct security parameters; the system information includes one or more errors that are not consistent with a configuration of the wireless device; and a threshold number of access attempts by the wireless device using the provided system information have failed. As another example, determining module 810 may determine that the network fails to authenticate itself to the wireless device after the wireless device accesses the network. As another example, determining module 810 may determine that a number of received signals that do not contain a correct security checksum exceeds a threshold value.

Determining module 810 may include or be included in one or more processors, such as processing circuitry 520 described above in relation to FIG. 5. Determining module 810 may include analog and/or digital circuitry configured to perform any of the functions of determining module 810 and/or processing circuitry 520 described above. The functions of determining module 810 described above may, in certain embodiments, be performed in one or more distinct modules.

Communication module 820 may perform the transmission functions of wireless device 110. For example, communication module 820 may report, to a network node of the network, that the wireless device has detected one or more abnormal signals indicative of network jamming. As another example, communication module 820 may send one or more measurement reports to a network node for use by the network node or another network node to detect network jamming Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810. In certain embodiments, the functions of communication module 820 described above may be performed in one or more distinct modules.

Receiving module 830 may perform the receiving functions of wireless device 110. For example, receiving module 830 may receive one or more transmissions in a frequency band used by an operator of the network. Receiving module 830 may include a receiver and/or a transceiver. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810. The functions of receiving module 830 described above may, in certain embodiments, be performed in one or more distinct modules.

Input module 840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 810. The functions of input module 840 described above may, in certain embodiments, be performed in one or more distinct modules.

Display module 850 may present signals on a display of wireless device 110. Display module 850 may include the display and/or any appropriate circuitry and hardware configured to present signals on the display. Display module 850 may receive signals to present on the display from determining module 810. The functions of display module 850 described above may, in certain embodiments, be performed in one or more distinct modules.

Determining module 810, communication module 820, receiving module 830, input module 840, and display module 850 may include any suitable configuration of hardware and/or software. Wireless device 110 may include additional modules beyond those shown in FIG. 8 that may be responsible for providing any suitable functionality, including any of the functionality described above and/or any additional functionality (including any functionality necessary to support the various solutions described herein).

Figure 9:
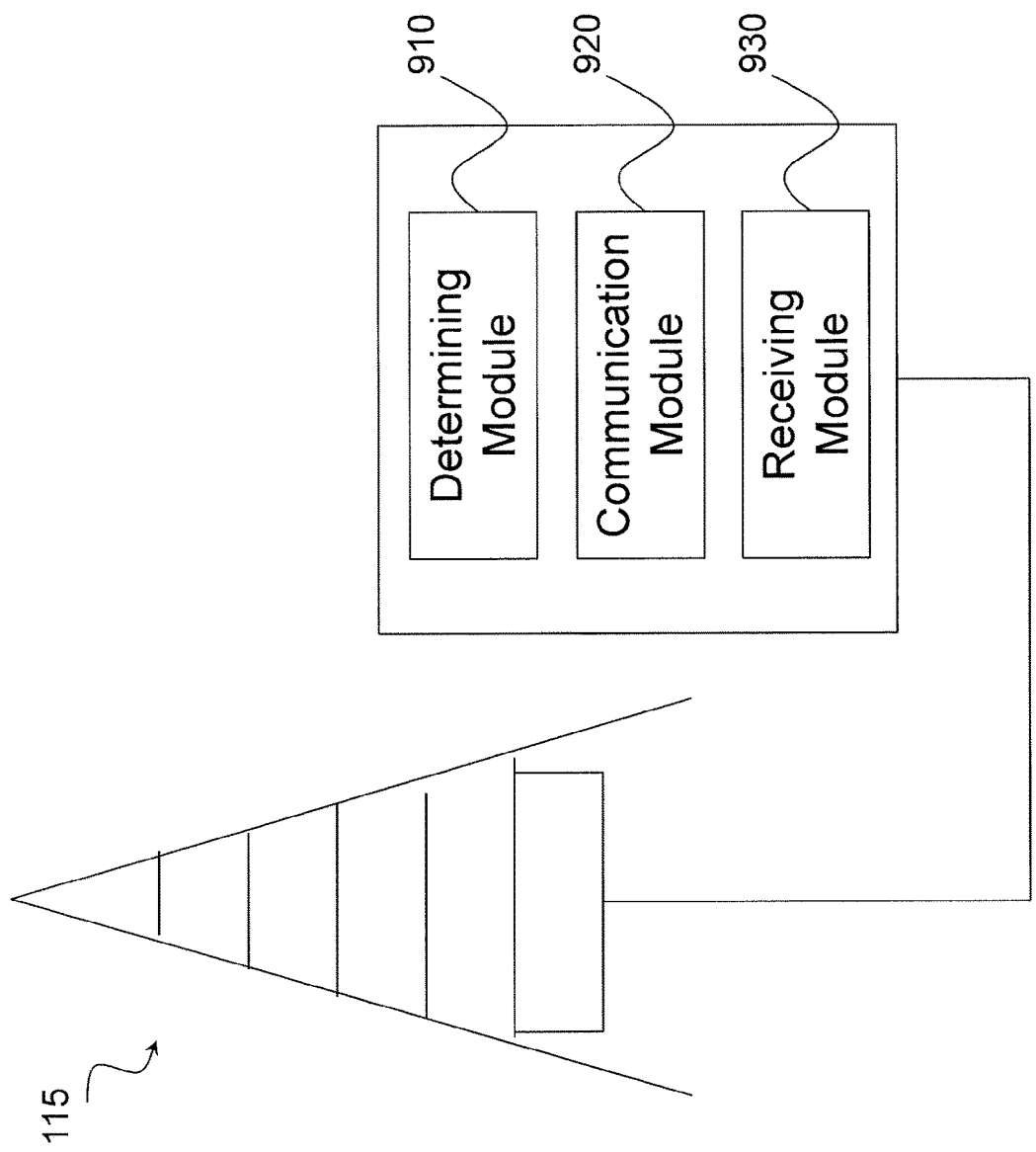
FIG. 9 is a block schematic of an exemplary network node, in accordance with certain embodiments.

FIG. 9 is a schematic block diagram of an exemplary network node 115, in accordance with certain embodiments. Network node 115 may include one or more modules. For example, network node 115 may include determining module 910, communication module 920, receiving module 930, and any other suitable modules. In some embodiments, one or more of determining module 910, communication module 920, receiving module 930, or any other suitable module may be implemented using one or more processors, such as processing circuitry 620 described above in relation to FIG. 6. In certain embodiments, the functions of two or more of the various modules may be combined into a single module. Network node 115 may perform the methods for detecting network jamming described above with respect to FIGS. 1-3.

Determining module 910 may perform the processing functions of network node 115. For example, determining module 910 may monitor one or more aspects of network activity for an indication of network jamming. As another example, determining module 910 may detect, based on the monitored one or more aspects of network activity, that network jamming is occurring in the network. As still another example, determining module 910 may determine that a number of wireless devices are requesting one or more channels that are subsequently not used, and determine that the number of wireless devices requesting the one or more channels that are subsequently not used exceeds a threshold value. As yet another example, determining module 910 may monitor an interference level in the network, and determine that the interference level in the network is above a threshold value. As another example, determining module 910 may determine one or more of: a number of active users in the network; and an amount of traffic in the network. As another example, determining module 910 may determine that network jamming is occurring in the network when one or more of: the number of active users in the network is lower than an expected number of active users for a particular time; and the amount of traffic in the network is lower than an expected amount of traffic for the particular time. As another example, determining module 910 may determine that network jamming is occurring in the network when one or more of: the number of active users in the network is higher than an expected number of active users for a particular time; and the amount of traffic in the network is higher than an expected amount of traffic for the particular time. As another example, determining module 910 may determine that a number of transmissions by one or more wireless devices fail integrity protection, and determine that the number of transmissions by the one or more wireless devices that fail integrity protection exceeds a threshold. As another example, determining module 910 may detect that network jamming is occurring in the network based on the received one or more measurement reports from the one or more wireless devices.

Determining module 910 may include or be included in one or more processors, such as processing circuitry 620 described above in relation to FIG. 6. Determining module 910 may include analog and/or digital circuitry configured to perform any of the functions of determining module 910 and/or processing circuitry 620 described above. The functions of determining module 910 may, in certain embodiments, be performed in one or more distinct modules.

Communication module 920 may perform the transmission functions of network node 115. As one example, communication module 920 may report the detected network jamming to one or more of: another network node; and a law enforcement authority. Communication module 920 may transmit messages to one or more of wireless devices 110. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910 or any other module. The functions of communication module 920 may, in certain embodiments, be performed in one or more distinct modules.

Receiving module 930 may perform the receiving functions of network node 115. For example, receiving module 930 may receive, from a wireless device, a report indicating that the wireless device has detected one or more abnormal signals indicative of network jamming. As another example, receiving module 930 may receive one or more measurement reports from one or more wireless devices. Receiving module 930 may receive any suitable information from a wireless device. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910 or any other suitable module. The functions of receiving module 930 may, in certain embodiments, be performed in one or more distinct modules.

Determining module 910, communication module 920, and receiving module 930 may include any suitable configuration of hardware and/or software. Network node 115 may include additional modules beyond those shown in FIG. 9 that may be responsible for providing any suitable functionality, including any of the functionality described above and/or any additional functionality (including any functionality necessary to support the various solutions described herein).

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, memory may comprise computer readable means on which a computer program can be stored. The computer program may include instructions which cause a processor (and any operatively coupled entities and devices, such as interfaces and memory) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors, possibly in cooperation with memory. Processors and memory may thus be arranged to allow processors to fetch instructions from memory and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP $3^{rd}$ Generation Partnership Project
AP Access Point
ASIC Application Specific Integrated Circuit
BER Block Error Rate
BS Base Station
BSC Base Station Controller
BTS Base Transceiver Station
CD Compact Disk
CPE Customer Premises Equipment
CPU Central Processing Unit
CRC Cyclic Redundancy Check
D2D Device-to-device
DAS Distributed Antenna System
DL Downlink
DoS Denial of Service
DVD Digital Video Disk
eNB evolved Node B
E-SMLC Evolved Serving Mobile Location Center
FPGA Field Programmable Gate Array
GPS Global Positioning System
IoT Internet of Things
IP Internet Protocol
LAN Local Area Network
LEE Laptop Embedded Equipment
LME Laptop Mounted Equipment
LTE Long Term Evolution
M2M Machine-to-Machine
MAC Message Authentication Code
MAN Metropolitan Area Network
MCE Multi-cell/multicast Coordination Entity
MCS Modulation level and coding scheme
MDT Minimization of Drive Test
MIMO Multiple Input Multiple Output
MME Mobility Management Entity
MSC Mobile Switching Center
MSR Multi-standard Radio
MTC Machine-Type Communication
NAS Non-Access Stratum
NB-IoT Narrow band Internet of Things
NR New Radio
O&M Operations and Management
OSS Operations Support System
PSTN Public Switched Telephone Network
RAM Random Access Memory
RAN Radio Access Network
RAT Radio Access Technology
RNC Radio Network Controller
ROM Read-Only Memory
RRC Radio Resource Control
RRH Remote Radio Head
RRU Remote Radio Unit
SON Self-Organizing Network
TR Technical Report
UE User Equipment
UL Uplink WAN Wide Area Network
WLAN Wireless Local Area Network

The invention claimed is:

1. A method in a network node, comprising:
monitoring one or more aspects of network activity for an indication of network jamming, wherein monitoring one or more aspects of network activity for an indication of network jamming comprises determining that a number of wireless devices are requesting one or more channels that are subsequently not used; and
detecting, based on the monitored one or more aspects of network activity, that network jamming is occurring in the network.

2. The method of claim 1, wherein:
detecting that network jamming is occurring in the network comprises determining that the number of wireless devices requesting the one or more channels that are subsequently not used exceeds a threshold value.

3. The method of claim 1, wherein:
monitoring one or more aspects of network activity for an indication of network jamming comprises monitoring an interference level in the network; and
detecting that network jamming is occurring in the network comprises determining that the interference level in the network is above a threshold value.

4. The method of claim 1, wherein monitoring one or more aspects of network activity for an indication of network jamming comprises determining one or more of:
a number of active users in the network; and
an amount of traffic in the network.

5. The method of claim 4, wherein detecting, based on the monitored one or more aspects of network activity, that network jamming is occurring in the network comprises:
determining that network jamming is occurring in the network when one or more of:
the number of active users in the network is lower than an expected number of active users for a particular time; and
the amount of traffic in the network is lower than an expected amount of traffic for the particular time.

6. The method of claim 4, wherein detecting, based on the monitored one or more aspects of network activity, that network jamming is occurring in the network comprises:
determining that network jamming is occurring in the network when one or more of:
the number of active users in the network is higher than an expected number of active users for a particular time; and
the amount of traffic in the network is higher than an expected amount of traffic for the particular time.

7. The method of claim 1, wherein:
monitoring one or more aspects of network activity for an indication of network jamming comprises determining that a number of transmissions by one or more wireless devices fail integrity protection; and
detecting that network jamming is occurring in the network comprises determining that the number of transmissions by the one or more wireless devices that fail integrity protection exceeds a threshold.

8. The method of claim 1, comprising:
receiving, from a wireless device, a report indicating that the wireless device has detected one or more abnormal signals indicative of network jamming.

9. The method of claim 8, wherein the report comprises one or more of:
a type of measurement performed by the wireless device;
a type of signal detected by the wireless device;
a time a signal was detected by the wireless device;
a date the signal was detected by the wireless device;
an indication of a location of the wireless device;
an indication of a frequency of the signal measured or detected by the wireless device; and
a radio access type.

10. The method of claim 1, comprising:
receiving one or more measurement reports from one or more wireless devices; and
detecting that network jamming is occurring in the network based on the received one or more measurement reports from the one or more wireless devices.

11. The method of claim 1, comprising:
reporting the detected network jamming to one or more of:
another network node; and
a law enforcement authority.

12. A network node, comprising:
processing circuitry, the processing circuitry configured to:
monitor one or more aspects of network activity for an indication of network jamming, wherein the processing circuitry configured to monitor one or more aspects of network activity for an indication of network jamming comprises the processing circuitry configured to determine that a number of wireless devices are requesting one or more channels that are subsequently not used; and
detect, based on the monitored one or more aspects of network activity, that network jamming is occurring in the network.

13. The network node of claim 12, wherein:
the processing circuitry configured to detect that network jamming is occurring in the network comprises processing circuitry configured to determine that the number of wireless devices requesting the one or more channels that are subsequently not used exceeds a threshold value.

14. The network node of claim 12, wherein:
the processing circuitry configured to monitor one or more aspects of network activity for an indication of network jamming comprises processing circuitry configured to monitor an interference level in the network; and
the processing circuitry configured to detect that network jamming is occurring in the network comprises processing circuitry configured to determine that the interference level in the network is above a threshold value.

15. The network node of claim 12, wherein the processing circuitry configured to monitor one or more aspects of network activity for an indication of network jamming comprises processing circuitry configured to determine one or more of:
a number of active users in the network; and
an amount of traffic in the network.

16. The network node of claim 12, wherein the processing circuitry configured to detect, based on the monitored one or more aspects of network activity, that network jamming is occurring in the network comprises processing circuitry configured to:
determine that network jamming is occurring in the network when one or more of:
the number of active users in the network is lower than an expected number of active users for a particular time; and
the amount of traffic in the network is lower than an expected amount of traffic for the particular time.

17. The network node of claim 12, wherein the processing circuitry configured to detect, based on the monitored one or more aspects of network activity, that network jamming is occurring in the network comprises processing circuitry configured to:
  determine that network jamming is occurring in the network when one or more of:
    the number of active users in the network is higher than an expected number of active users for a particular time; and
    the amount of traffic in the network is higher than an expected amount of traffic for the particular time.

18. The network node of claim 12, wherein:
  the processing circuitry configured to monitor one or more aspects of network activity for an indication of network jamming comprises processing circuitry configured to determine that a number of transmissions by one or more wireless devices fail integrity protection; and
  the processing circuitry configured to detect that network jamming is occurring in the network comprises processing circuitry configured to determine that the number of transmissions by the one or more wireless devices that fail integrity protection exceeds a threshold.

19. The network node of claim 12, wherein the processing circuitry is configured to:
  receive, from a wireless device, a report indicating that the wireless device has detected one or more abnormal signals indicative of network jamming.

20. The network node of claim 19, wherein the report comprises one or more of:
  a type of measurement performed by the wireless device;
  a type of signal detected by the wireless device;
  a time a signal was detected by the wireless device;
  a date the signal was detected by the wireless device;
  an indication of a location of the wireless device;
  an indication of a frequency of the signal measured or detected by the wireless device; and
  a radio access type.

21. The network node of claim 12, wherein the processing circuitry is configured to:
  receive one or more measurement reports from one or more wireless devices; and
  detect that network jamming is occurring in the network based on the received one or more measurement reports from the one or more wireless devices.

22. The network node of claim 12, wherein the processing circuitry is configured to:
  report the detected network jamming to one or more of:
    another network node; and
    a law enforcement authority.

* * * * *